United States Patent
Mattankot et al.

(10) Patent No.: US 10,936,540 B2
(45) Date of Patent: Mar. 2, 2021

(54) METHODS FOR ACCELERATING STORAGE MEDIA ACCESS AND DEVICES THEREOF

(71) Applicant: NetApp, Inc., Sunnyvale, CA (US)

(72) Inventors: Nikhil Mattankot, Cupertino, CA (US); Bharadwaj V. R., San Jose, CA (US); Manish Katiyar, Fremont, CA (US); Aditya Kulkarni, San Jose, CA (US); Daniel Ting, Palo Alto, CA (US); Asif Pathan, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 306 days.

(21) Appl. No.: 15/921,260

(22) Filed: Mar. 14, 2018

(65) Prior Publication Data

US 2019/0286717 A1 Sep. 19, 2019

(51) Int. Cl.
  *G06F 16/00*   (2019.01)
  *G06F 16/11*   (2019.01)
  *G06F 16/14*   (2019.01)
  *G06F 16/16*   (2019.01)
  *G06F 16/13*   (2019.01)

(52) U.S. Cl.
  CPC .......... *G06F 16/122* (2019.01); *G06F 16/128* (2019.01); *G06F 16/13* (2019.01); *G06F 16/148* (2019.01); *G06F 16/162* (2019.01); *G06F 16/164* (2019.01)

(58) Field of Classification Search
  CPC ...... G06F 16/13; G06F 16/128; G06F 16/162; G06F 16/164
  See application file for complete search history.

(56) References Cited

U.S. PATENT DOCUMENTS

| 8,171,285 | B2 * | 5/2012 | Platt | ................... G06F 11/1417 380/246 |
| 8,832,154 | B1 | 9/2014 | Srinivasan et al. | |
| 9,021,452 | B2 * | 4/2015 | Kripalani | ................ G06F 30/20 717/135 |

(Continued)

OTHER PUBLICATIONS

S.A. Brandt et al., "Efficient Metadata Management in Large Distributed Storage Systems", Proceedings 20th IEEE/11th NASA Goodard Conference on Mass Storage Systems and Technologies (MSS'03), 2003, 9 pages, IEEE.

(Continued)

*Primary Examiner* — Jean M Corrielus
(74) *Attorney, Agent, or Firm* — Troutman Pepper Hamilton Sanders LLP

(57) ABSTRACT

Methods, non-transitory computer readable media, and computing devices that accelerate data access requests. With this technology, a hierarchy of a plurality of objects is inserted into a location database. Each of at least a subset of the plurality of objects comprises a physical storage location for data stored in a filesystem. One or more of the plurality of objects includes an object version number and a parent version number of a parent one of the plurality of objects. A determination is made when an invalidation event has occurred in the filesystem. The invalidation event is associated with one of the plurality of objects. The object version number for the one of the plurality of objects is modified to invalidate one or more of the subset of the objects, when the determining indicates that the invalidation event has occurred in the filesystem.

19 Claims, 6 Drawing Sheets

(56) References Cited

U.S. PATENT DOCUMENTS

| | | | |
|---|---|---|---|
| 9,754,005 B2* | 9/2017 | Potter | G06F 11/1461 |
| 2009/0271412 A1 | 10/2009 | Lacapra et al. | |
| 2013/0198350 A1* | 8/2013 | Moore | H04L 29/06 |
| | | | 709/221 |
| 2015/0012778 A1* | 1/2015 | Moore | H04L 29/06 |
| | | | 714/20 |
| 2015/0142748 A1* | 5/2015 | Gottemukkula | G06F 11/1451 |
| | | | 707/649 |
| 2015/0161194 A1* | 6/2015 | Provenzano | G06F 16/24 |
| | | | 707/690 |
| 2015/0163121 A1* | 6/2015 | Mahaffey | H04L 63/1425 |
| | | | 707/687 |
| 2017/0212686 A1* | 7/2017 | Moore | H04L 29/06 |
| 2018/0196816 A1* | 7/2018 | Maybee | G06F 16/172 |
| 2018/0367560 A1* | 12/2018 | Mahaffey | H04L 41/142 |

OTHER PUBLICATIONS

International Search Report and Written Opinion for Corresponding Patent Application No. PCT/US2019/022253, dated Jun. 17, 2019, 14 pages.

* cited by examiner

METHODS FOR ACCELERATING STORAGE MEDIA ACCESS AND DEVICES THEREOF

FIELD

This technology relates to managing data storage networks and more particularly to methods and devices for accelerating storage media access.

BACKGROUND

Storage servers in storage networks generally store data across multiple data storage devices that together comprise a data container, which is also referred to herein as an aggregate. To store data, storage servers may employ various forms of local data storage devices, such as hard disk drives, solid state drives, flash drives, and/or tape devices, as well as remote data storage devices, such as cloud storage devices or repositories for example.

Filesystem software executed by storage controllers is generally responsible for defining an overall logical arrangement of storage space on data storage devices in storage networks. Accordingly, filesystem software performs layout management and services input/output (I/O) operations on behalf of client devices. In particular, filesystem software can organize volumes within aggregates and manage read and write operations, among other types of organizational structures and operations.

Clients utilizing data storage networks experience latency with respect to data access including network latency, filesystem software latency, and media latency of the data storage devices. The filesystem software in particular incurs context switching and message passing overhead, for example, which can significantly delay access to data, including for read and other types of access requests that do not impact filesystem data or layout.

DETAILED DESCRIPTION

Figure 1:
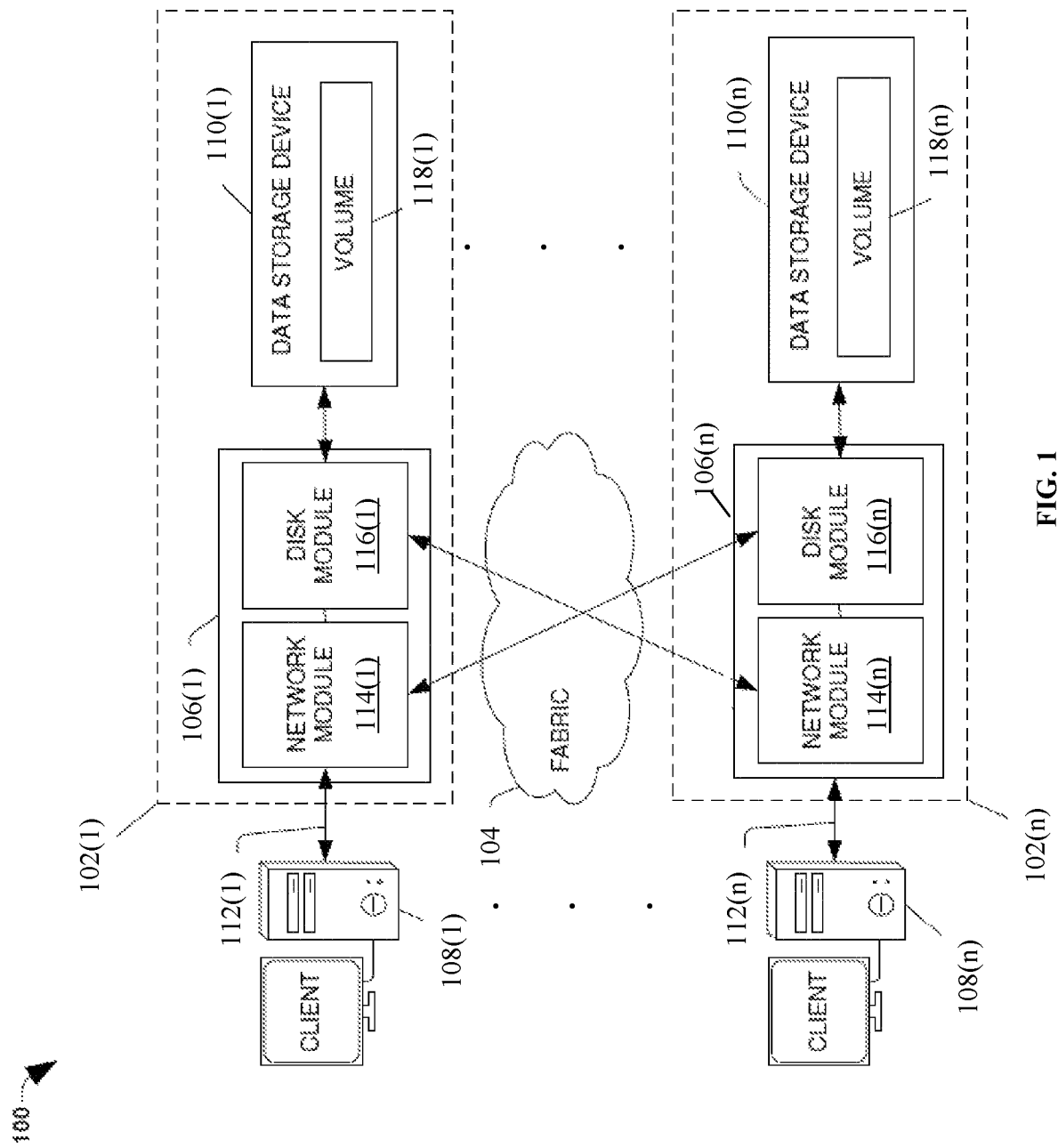
FIG. 1 is a block diagram of a network environment with exemplary data storage apparatuses that include node computing devices.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and computing devices that facilitate accelerated storage media access to reduce latency in servicing particular data storage operations, such as read requests.

In this example, node computing devices 106(1)-106(n) can be primary or local storage controllers or secondary or remote storage controllers that provide client devices 108(1)-108(n), with access to data stored within data storage devices 110(1)-110(n). The data storage apparatuses 102(1)-102(n) and/or node computing devices 106(1)-106(n) of the examples described and illustrated herein are not limited to any particular geographic areas and can be clustered locally and/or remotely, or not clustered in other examples. Thus, in one example the data storage apparatuses 102(1)-102(n) and/or node computing device 106(1)-106(n) can be distributed over a storage systems located in a geographic locations; while in another example a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices used for storage (e.g., storage servers), or other computers or peripheral devices, are coupled to the respective data storage apparatuses 102(1)-102(n) by network connections 112(1)-112(n). Network connections 112(1)-112(n) may include a local area network (LAN) or wide area network (WAN), for example, that utilize Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), and/or an object protocol, such as simple storage service (S3).

Illustratively, the client devices 108(1)-108(n) may be general-purpose computers running applications, and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage controller configured to process I/O commands issued by the client devices 108(1)-108(n)), and the data storage apparatuses 102(1)-102(n) may return results of the request to the client devices 108(1)-108(n) via the network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such node computing devices 106(1)-106(n) can be attached to the fabric 104 at a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 112(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks, files, or objects through the operating system, rather than expressly requesting abstract files.

While the clustered network environment 100 illustrates an equal number of network modules 114(1)-114(2) and disk modules 116(1)-116(n), other examples may include a differing number of these modules. For example, there may be a network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data (D) and/or parity (P) information.

The aggregates include volumes 118(1)-118(n) in this example, although any number of volumes can be included in the aggregates. The volumes 118(1)-118(n) are virtual data stores that define an arrangement of storage and one or more filesystems within the clustered network environment 100. Volumes 118(1)-118(n) can span a portion of a disk or other storage device, a collection of disks, or portions of disks, for example, and typically define an overall logical arrangement of data storage. In one example volumes 118(1)-118(n) can include stored user data as one or more files, blocks, or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(n), such as providing an ability for volumes 118(1)-118(n) to form clusters and perform deduplication, among other functionality.

In one example, to facilitate access to data stored on the disks or other structures of the data storage devices 110(1)-110(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, and/or files. Among other things, these features, but more particularly the LUNs allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
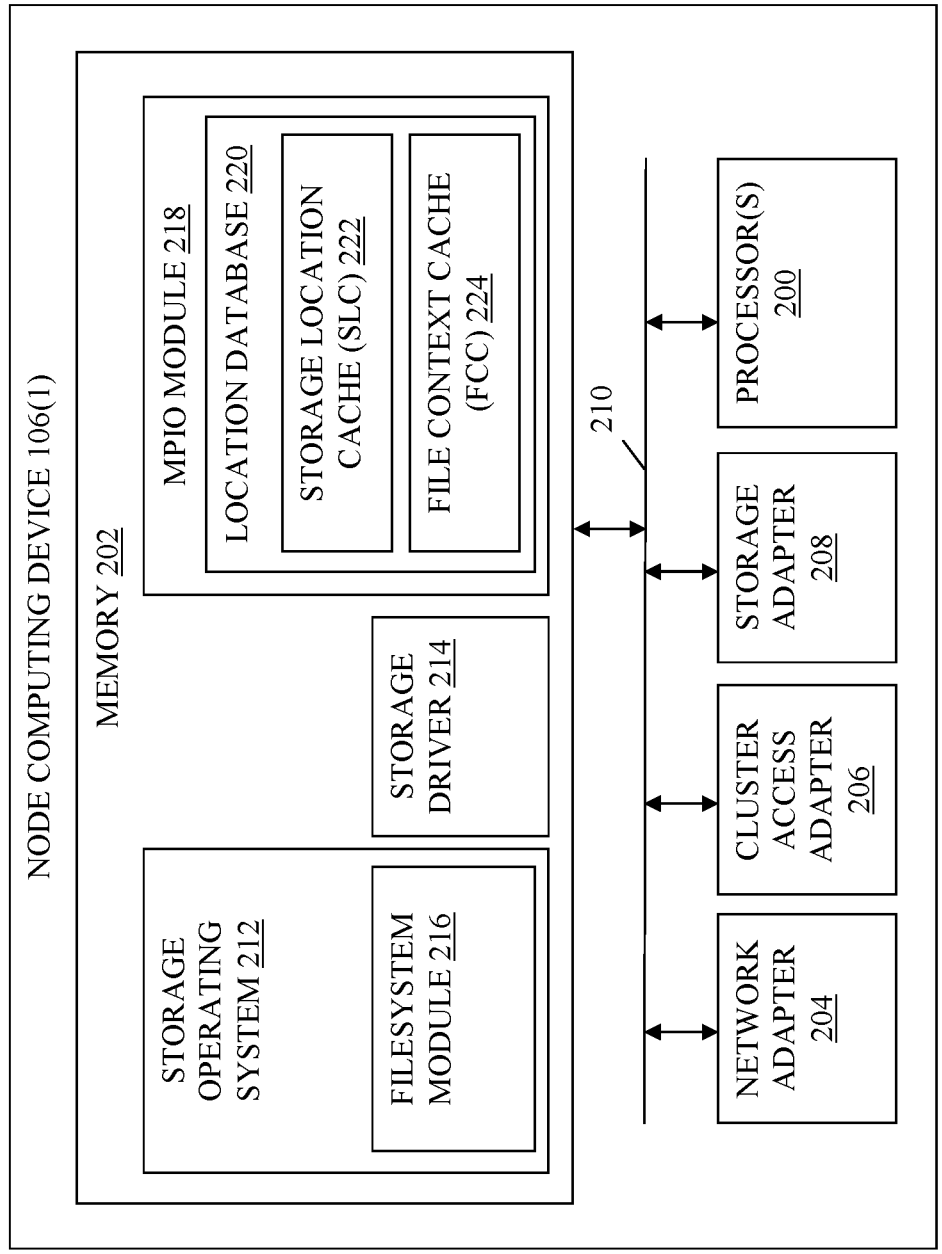
FIG. 2 is a block diagram of an exemplary one of the node computing devices shown in FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a RAID data loss protection and recovery scheme to optimize reconstruction of data of a failed disk or drive in an array. In some examples, the node computing device 106(n) is substantially the same in structure and/or operation as node computing device 106(1), although the node computing device 106(n) can also include a different structure and/or operation in one or more aspects than the node computing device 106(1).

The network adapter 204 in this example includes the mechanical, electrical and signaling circuitry needed to connect the node computing device 106(1) to one or more of the client devices 108(1)-108(n) over network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(2) and/or sent to another node computing device attached via the cluster fabric 104. In some examples, a storage driver 214 in the memory 202 interfaces with the storage adapter to facilitate interactions with the data storage devices 110(1)-110(n).

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The file system module 216 of the storage operating system 212 can establish and manage one or more filesystems including software code and data structures that implement a persistent hierarchical namespace of files and directories, for example. As an example, when a new data storage device (not shown) is added to a clustered network system, the file system module 216 is informed where, in an existing directory tree, new files associated with the new data storage device are to be stored. This is often referred to as "mounting" a filesystem.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the memory 202 further includes a multi-processor input/output (MPIO) module 218 that stores a location database 220 with a storage location cache (SLC) 222 and file context cache (FCC) 220. The MPIO module 218 is separate from the file system module 216 and is executable in a different execution context than the file system module 216. The MPIO module 218 generally provides a multi-processor -safe and consistent location database 220 that allows the client 108(1), for example, to obtain direct access to the data storage device 110(1) for certain types of intercepted requests in order to reduce the software latency associated with the file system module 216.

While the MPIO module 218 is implemented in software stored in the memory 202 in this example, the MPIO module 218 can also be implemented in hardware or a combination of hardware and software, and can be located elsewhere in the network environment 100. In other examples, the MPIO module 216 can be implemented within a storage controller virtual machine (VM) instance hosted by the node computing device 106(1), implemented by the client 108(1), or implemented by a separate device between the client 108(1)

and the node computing device 106(1), for example. Accordingly, the MPIO module 218 can be located anywhere in the network environment 100 that is in a communication path of the client 108(1) and the node computing device 106(1).

The file system module 216 in this example effectively exports the location database 220 for use by consumers, such as the client 108(1), outside of the filesystem infrastructure. The location database 220 is aware of, and consistent with, the layout of the filesystem, and usable by the client 108(1), such as a protocol server, which is built on top of the filesystem infrastructure. In one particular example, the location database 220 is used by FCP and/or iSCSI protocol servers to obtain accelerated access to flash data storage device(s). In particular, the client 108(1) is enabled to perform direct input/output (IO) to the data storage device 110(1) on which the filesystem is laid out using the location database 220. When data is modified or moved, for example, the location database 220 is updated by the filesystem module 216 so that the client 108(1) does not access invalid or stale data.

More specifically, the SLC 222 in this example is a collection of objects that include mappings of logical to physical addresses for file blocks, although other types of storage structures can also be used. Accordingly, the mappings can be LUN logical block addresses (LBAs) to physical volume block numbers (PVBNs), which correspond to media storage locations on the data storage device 110(1) and are assigned by the filesystem module 216. More specifically, the PVBNs can be translated to a disk ID and block number based on the filesystem topology information for the volume 118(1), although other types of logical and/or physical addresses can be used in other examples.

The SLC 222 maintains the mappings opportunistically for a subset of the data stored on disks of the data storage device 110(1) (e.g., a subset of the data most likely to be subsequently retrieved). Accordingly, the MPIO module 218 can implement a replacement policy to ensure that relatively valuable objects with mappings are maintained in the SLC 222 (e.g., objects associated with file blocks most likely to be subsequently accessed). In addition to the mappings, the objects in the SLC 222 can store other information and metadata including lost-write context for the associated file blocks to facilitate validation of data before consumption by the client 108(1).

In this example, the FCC 224 maintains information about the state of LUNs or files and the volume 118(1) and, optionally, an associated snapshot that the files belong to, for example. The FCC 224 stores metadata that supports the SLC 222 and facilitates determining whether the information in the SLC 222 is valid and usable. More specifically, the FCC 224 stores a hierarchy of objects corresponding to a structure of the filesystem. In one particular example, the structure of the filesystem includes the file blocks, inode data structures (also referred to herein as inodes) that are parents of the file blocks, snapshots that are parents of the inodes and are applicable for inodes that are loaded from snapshots, volumes that are parents of the snapshots, and aggregates that are parents of the volumes.

The objects at the bottom of the hierarchy (also referred to as leaves) corresponding to the file blocks comprise the mappings of logical addresses to the physical storage locations and are stored in the SLC 222. Accordingly, in other examples, the SLC 222 and FCC 224 can be combined in the location database 220. The objects corresponding to the inodes in this example store attributes, such as file size and permissions, the objects corresponding to the volumes (e.g., volume 118(1)) store a topology and mount state, for example. Additionally, objects corresponding to inodes in this example are indexed by a file handle or LUN ID, while objects corresponding to volumes are indexed by a filesystem ID. Accordingly, each of the objects stores various metadata and an index to another object in the hierarchy maintained by the FCC 224.

The SLC 222 and FCC 224 are organized to support invalidation of the data maintained by the location database 220 through version numbering. Accordingly, the objects in the SLC 222 and FCC 224 have associated version numbers including an initial version number, which can be a current time-stamp counter in some examples. The version number is modified by the filesystem module 216 when a relevant property of the object changes in the filesystem. Accordingly, when an event occurs in the filesystem that modifies an attribute in an object (also referred to as an invalidation event), a handler for the event updates (e.g., asynchronously) the version number of the object in the location database 220, as well as, optionally, the attribute.

For example, if a truncation operation changes the size of a file, the file size attribute in the corresponding object in the FCC 224 that is a parent to the block(s) of the file is updated and the version number of that object is modified (e.g., incremented or set based on a current time-stamp counter). In another example, if a volume is taken offline and then brought back online, the version number for the object in the FCC 224 corresponding to the volume is modified. In order to support validation, each child object in the location database 220 also stores the version of the parent at the time the child object was created or last updated.

Accordingly, each object in the SLC 222 stores the version number of an object corresponding to a parent inode at the time the object was created or inserted into the location database 220. When an object in the SLC 222 is queried by the MPIO module 218, the version number stored in the object is compared with the current version number of the object corresponding to the parent inode. If the version numbers do not match, then one or more inode attributes have changed since the object in the SLC 222 was cached, and the object is considered stale and the associated information (e.g., physical storage location) unsafe to use. However, if the version numbers do match, then inode attributes that might render the object in the SLC 222 invalid have not changed since the object was cached and, therefore, the object may be valid and the associated information safe to use.

While the objects corresponding to the file blocks and inodes may have matching version numbers, the mapping in the object in the SLC 222 could still be invalid (e.g., if the object corresponding to the inode is not current). Accordingly, the object corresponding to the volume that is the parent to the inode in the filesystem must be compared to the version number for that volume object maintained in the inode object, and the entire path in the hierarchy must be compared accordingly, as described and illustrated in more detail later. In this particular example, the object corresponding to the aggregate stores a mount sequence number of the aggregate when the object was cached. The mount sequence number is compared with a current mount sequence number obtained from the filesystem to confirm the validity of a particular path in the hierarchy. Other types of filesystem structures and hierarchies can be used in other examples.

Accordingly, with this technology, when an attribute of an object in the hierarchy maintained by the location database 220 changes, it has the effect of implicitly invalidating all cached objects in that subtree or path of the hierarchy. In particular, subsequent to an invalidation of a parent, the child objects will only be valid and useful again once they are updated. For example, after a volume is brought online, if an inode was loaded again, then the object corresponding to the inode in the FCC 224 would receive an update and modified version number. When buffers are loaded, for example, objects in the SLC 222 that are children of the object corresponding to the inode in the FCC 224 would be refreshed or created and would then be valid and usable.

The examples of the technology described and illustrated herein may be embodied as one or more non-transitory computer readable media having machine or processor-executable instructions stored thereon for one or more aspects of the present technology, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-6, for example.

Figure 3:
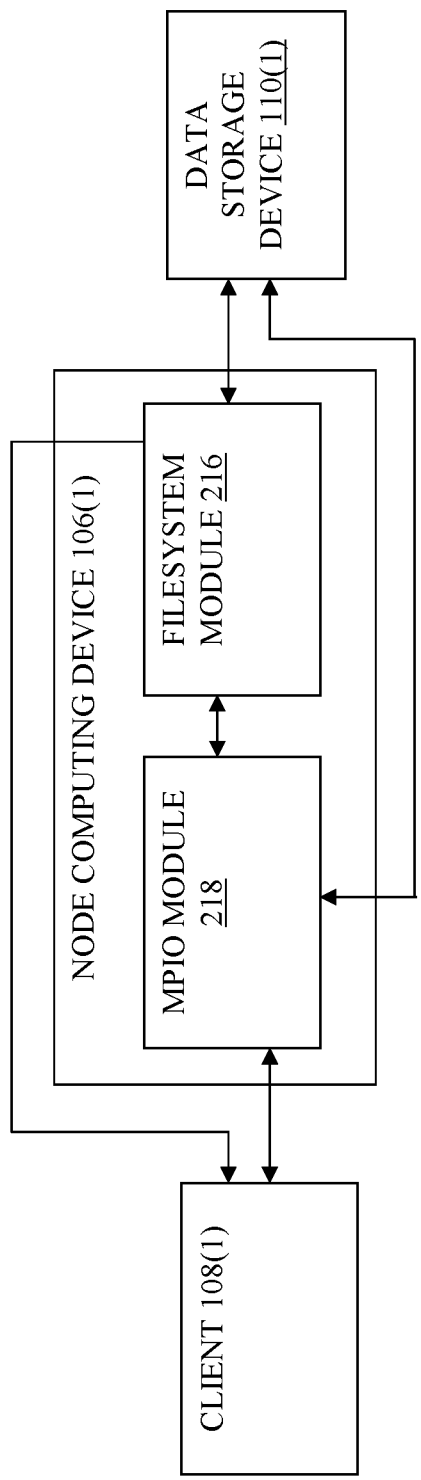
FIG. 3 is an exemplary flow diagram illustrating a method for accelerating storage media access.

Referring more specifically to FIG. 3, a flow diagram illustrating an exemplary method for accelerating storage media access is illustrated. In this example, the MPIO module 218 hosted by the node computing device 106(1) is configured to intercept data access requests (e.g., read requests) originating from the client 108(1). The MPIO module 218 determines whether the data access request can be serviced using the location database 220 and a direct access to the data storage device 110(1) without implicating or communicating with the filesystem module 216 executing in a different execution context on the node computing device 106(1) than the MPIO module 218.

If the MPIO module 218 can service the data access request directly using the location database 220 and data storage device 110(1) or a buffer cache in memory, then the client 108(1) advantageously experiences reduced latency by avoiding the overhead required by the filesystem module 216 to service such requests and/or accessing data immediately in core allowing the client 108(1), for example, to obtain data synchronously. The operation of the MPIO module 218 with respect to servicing an exemplary read request is described and illustrated in more detail later with reference to FIG. 6, although this technology can facilitate accelerated access to data for many other types of requests.

However, if the MPIO module 218 cannot service the data access request directly (e.g., when the SLC 222 object associated with block(s) associated with a file requested by the client 108(1) is determined to be invalid or is not found), then the data access request is forwarded to the filesystem module 216 for servicing. The filesystem module 216 can then service the data access request using the data storage device 110(1) and return a response to the requesting client 108(1).

Figure 4:
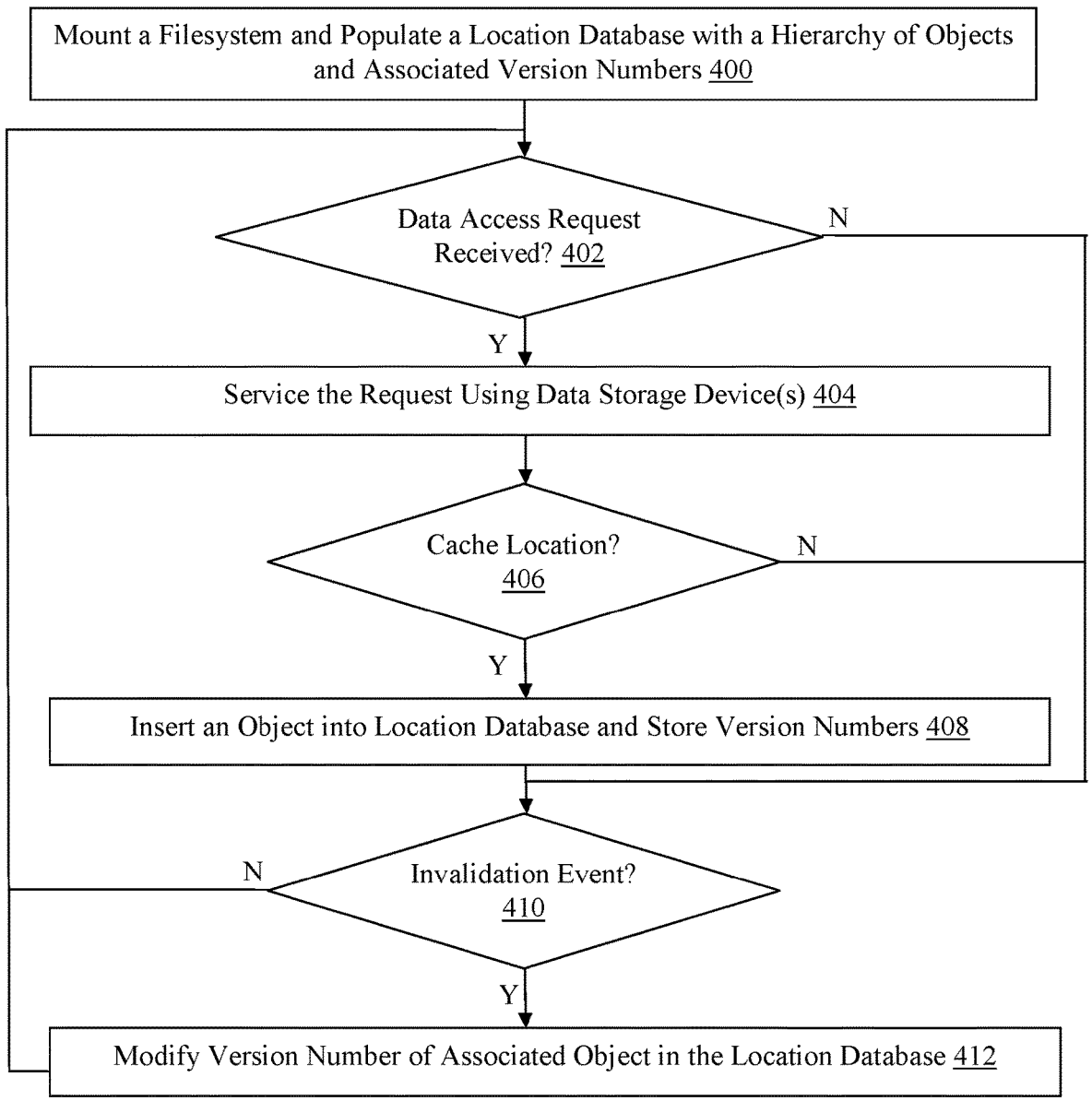
FIG. 4 is a flowchart of an exemplary method for establishing and managing a location database.

Concurrently, the filesystem module 216 inserts and updates objects, including in response to invalidation events, as described and illustrated in more detail with reference to FIG. 4, in which a flowchart of an exemplary method for establishing and managing the location database 220 is illustrated. In step 400 in this particular example, the node computing device 106(1) executing the filesystem module 216 mounts a filesystem and populates the location database 220 with a hierarchy of objects and version numbers. Accordingly, the node computing device 106(1) inserts objects in the SLC 222 corresponding to file blocks and sets a version number in the objects, such as based on a current timestamp counter, for example.

The node computing device 106(1) further creates objects in the FCC 224 corresponding to the filesystem structure, such as inode, snapshot, volume, and/or aggregate objects, for example, although other types of objects can also be created and inserted into the FCC 224. The node computing device 106(1) also sets a version number for each of the objects inserted into the FCC 224, which can be the same as the version number used during the mounting for the objects inserted into the SLC 222. In addition to the version number, the node computing device 106(1) can store various metadata in one or more of the objects (e.g., file size for objects in the FCC 224 corresponding to inodes).

Additionally, the node computing device 106(1) sets another version number in each of the objects (except, optionally, aggregate objects) that corresponds with the version number of a parent object. Accordingly, for objects in the SLC 222 corresponding to file blocks, another version number is set corresponding to the version number set for the inodes objects that are parents in the hierarchy and filesystem to the file block objects.

Figure 5:
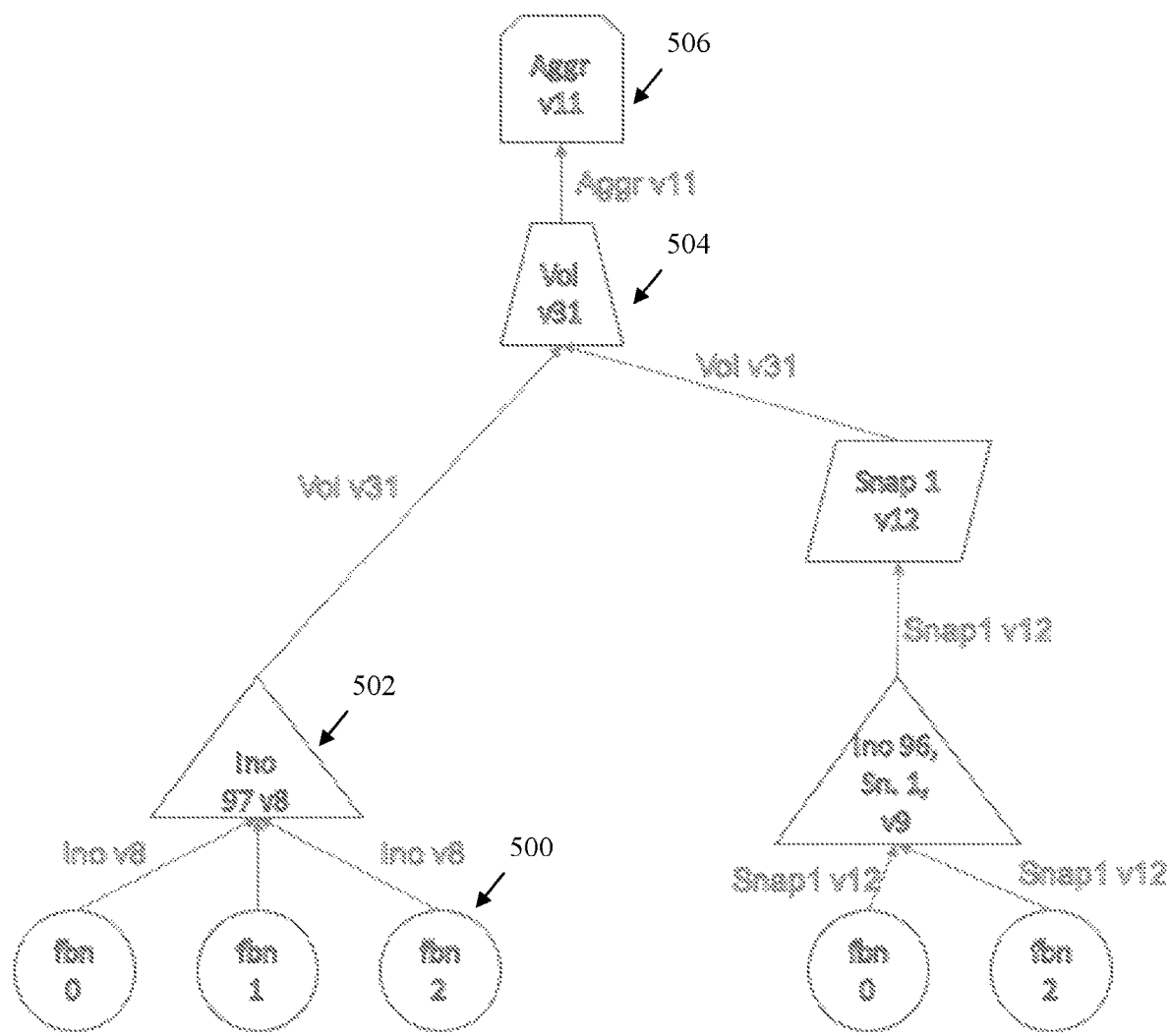
FIG. 5 is a block diagram illustrating hierarchical objects and version numbers stored in an exemplary location database.

Referring more specifically to FIG. 5, a block diagram of hierarchical objects and version numbers stored in the location database 220 is illustrated. In this example, the hierarchy of objects includes file block, inode, snapshot, volume, and aggregate objects. In one particular example, the file block object 500 stores the version number (V8) of the parent inode object 502, which stores the version number of the parent volume object (V31), which stores the version number (V11) of the parent aggregate object (V11). Since each of the parent version numbers stored by a child object in this particular path is a match, the contents of the file block object 500 (e.g., a mapping of logical address to physical storage location) can be validated by the MPIO module 218, as described and illustrated in more detail later with reference to step 604 of FIG. 6.

Referring back to FIG. 4, in step 402, the node computing device 106(1) executing the filesystem module 216 determines whether a data access request is received at the filesystem module 216. The data access request can be a request from the client 108(1), such as a read request initially received by the MPIO module 218 but that did not result in a hit in the location database 220. Alternatively, the data access request can be a write request originating from the client 108(1), and other types of requests can also be received in step 402. If the filesystem module 216 executed by the node computing device 106(1) determines that a data access request has been received, then the Yes branch is taken to step 404.

In step 404, the node computing device 106(1) executing the filesystem module 216 services the data access request using the data storage device 110(1). Accordingly, the node computing device 106(1) can write data to the data storage device 110(1) and update the filesystem accordingly or retrieve data from the data storage device 110(1) to be sent to the requesting client 108(1), for example, and other types of operations can also be performed in order to service the received request.

In step 406, the node computing device 106(1) executing the filesystem module 216 determines whether to cache the location associated with the data access request received in step 402. The determination can be made by the filesystem module 216 based on a stored policy, for example, that caches locations most likely to be subsequently accessed, although the determination can be made in other ways in other examples. In one example, the determination is made only in response to read requests, although the determination can also be made in response to other types of data access requests. If the node computing device 106(1) determines that the location associated with the received data access request should be cached, then the Yes branch is taken to step 408.

In step 408, the node computing device 106(1) executing the filesystem module 216 inserts at least one object into the location database 220 (e.g., in the SLC 222) and stores in the object version numbers including both a current version number and the version number of the parent object (e.g., an inode object). In examples in which the inserted object is a file block object inserted into the SLC 222, the object can also store a mapping of logical address to physical store location. In some examples, more than one object may be inserted into the location database 220 (e.g., an inode and a file block object).

Since the filesystem module 216 maintains the layout of the filesystem in this example, the filesystem module 216 determines where in the hierarchy of the location database 220 to insert the object(s) (e.g., which inode object corresponds with the parent of a file block). In this way, the layout of the location database 220 is consistent with that of the filesystem. Additionally, the object can include a reference to the parent object in the hierarchy, other information and metadata may be inserted into the object(s) (e.g., file size for inode objects), and other methods of managing the hierarchy in the location database 220 can also be used in other examples. Subsequent to inserting the object in step 408, or if the node computing device 106(1) determines in step 402 that a data access request has not been received or in step 406 that the location should not be cached, and a respective No branch is taken, then the node computing device 106(1) proceeds to step 410.

In step 410, the node computing device 106(1) executing the filesystem module 216 determines whether an invalidation event has occurred with respect to the filesystem. Invalidation events can include restoring a snapshot, a volume going offline, or identifying a file block location change or truncation, for example, although other types of invalidation events that change particular attributes within the filesystem can also occur. If the node computing device 106(1) determines that an invalidation event has occurred, then the Yes branch is taken to step 412.

In step 412, the node computing device 106(1) executing the filesystem module 216 modifies a version number of an object associated with the invalidation event in the location database 220. In one particular example in which volume 118(1) is taken offline, the version number in the object in the FCC 224 corresponding to the volume 118(1) is modified (e.g., set to a current timestamp counter), thereby implicitly invalidating child inode objects, for example. In particular, the parent version number in the child inode objects will not match the modified version number in the parent volume object. Other types of invalidation events can occur and other types of modifications to version numbers in other types or number of objects in the location database 220 can also be used in other examples.

In some examples, the node computing device 106(1) can free space in the location database 220 by asynchronously traversing the objects in the location database 220 or otherwise identifying those objects that are no longer valid based on an analysis of the associated version numbers and removing those objects. Subsequent to modifying the version number of an associated object in the location database 220, or if the node computing device 106(1) determines that an invalidation event has not occurred and the No branch is taken from step 410, then the node computing device 106(1) proceeds back to step 400 in this example. In other examples one or more other steps can occur before or after any of steps 400-412, and one or more of steps 402-412 can be performed in parallel and/or in a different order.

Figure 6:
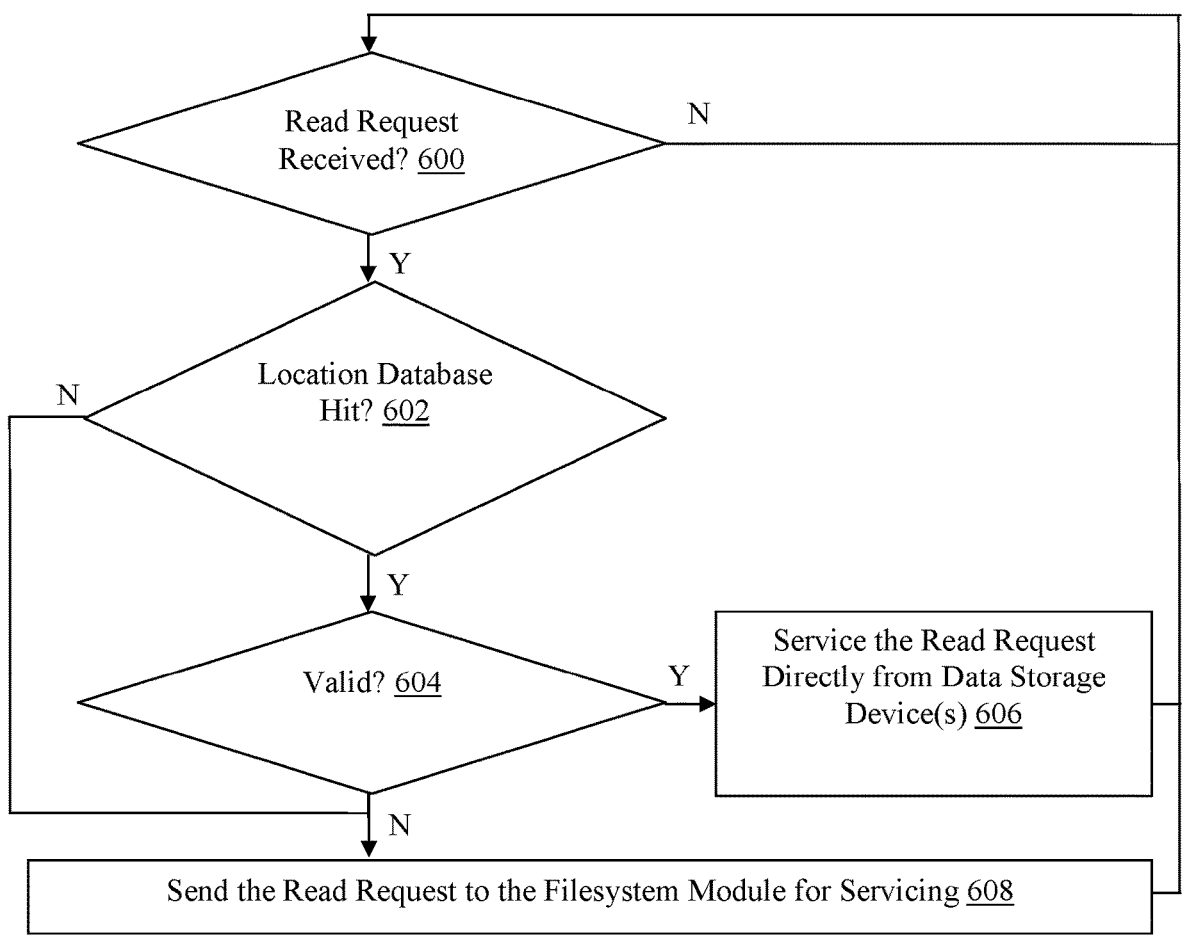
FIG. 6 is a flowchart of an exemplary method for accelerating service of read requests using a location database.

Referring more specifically to FIG. 6, a flowchart of an exemplary method for accelerating service of read requests using the location database 220 is illustrated. In step 600 in this example, the node computing device 106(1) executing the MPIO module 218 determines whether a request to read data stored in the filesystem is received. The read request can originate with the client 108(1) and be intercepted by the MPIO module 218 before reaching the filesystem module 216, for example, although the read request can also be generated in other ways. While accelerating service of a read request is described and illustrated with reference to FIG. 6, other types of requests that access data stored in the filesystem can also be accelerated in other examples.

If the node computing device 106(1) determines that a read request has not been received, then the No branch is taken back to step 600 and the node computing device 106(1) effectively waits for a read request to be received. However, if the node computing device determines in step 600 that a read request has been received, then the Yes branch is taken to step 602.

In step 602, the node computing device 106(1) executing the MPIO module 218 determines whether there is a hit in the location database 220. In this example, the MPIO module 218 queries the location database 220 using information included in the read request (e.g., a volume ID, LUN ID, and/or LBA) in order to determine whether the physical storage location associated with the requested data has been cached in the location database 220. Accordingly, the node computing device 106(1) in one example can compare the LBA to the logical addresses in mappings stored in file block objects in the SLC 222 to determine whether there is a match, for example, although other methods of determining whether there is a hit in the location database 220 can also be used in other examples. If the node computing device 106(1) determines that there is a hit in the location database 220, then the Yes branch is taken to step 604.

In step 604, the node computing device 106(1) determines whether the file block object(s) associated with the read request in the SLC 222, or the physical storage location included in a mapping stored therein, is valid. In order to determine whether a file block object in the SLC 222 is valid, the parent version number stored therein is compared to a version number in a parent inode object in the FCC 224 to determine whether there is a match. A path in the hierarchy of the FCC 224 is then traversed and all associated parent version numbers are compared to confirm that the version numbers match and that none of the objects in the path has implicitly invalidated the file block object in the SLC 222, as described and illustrated in more detail earlier with reference to FIG. 5. If the node computing device 106(1) determines that the file block object(s) associated with the read request in the SLC 222 are valid, then the Yes branch is taken to step 606.

In step 606, the node computing device 106(1) executing the MPIO module 218 services the read request directly from the data storage device 110(1) in this example. In order to service the read request, the node computing device 106(1) retrieves and utilizes the physical storage location from the file block object in the SLC 224 identified as corresponding to the read request. Since the location information shares the same namespace as maintained by the filesystem module 216, the physical storage location can be used to directly perform RDMA, DMA, SCSI, and/or cloud reads, for example, to retrieve the requested data from the data storage device 110(1). Accordingly, the requested data can be retrieved by the MPIO module 218 and returned to the client 108(1) without utilizing the filesystem module 216. In other examples, the MPIO module 218 can service the read request from a buffer cache in memory 202 without communicating with the data storage device 110(1).

However, if the node computing device 106(1) determines that there is not a hit in the location database 220 corresponding to the requested data and the No branch is taken from step 602, or that a file block object in the SLC 222 is not valid and the No branch is taken from step 604, then the node computing device 106(1) proceeds to step 608. In step 608, the node computing device 106(1) executing the MPIO module 218 sends the read request to the filesystem module 216 for servicing. The read request can then be received by the filesystem module 216, as described and illustrated in more detail earlier with reference to step 402 of FIG. 4, for example. Subsequent to servicing the read request in step 606, or sending the read request to the filesystem module 216 in step 608, the node computing device 106(1) can proceed back to step 600.

Accordingly, as described and illustrated herein, this technology advantageously facilitates relatively low cost, opportunistic, and relatively fast access to data in storage networks. In particular, this technology utilizes a location database exported and maintained by a filesystem module to process certain data access requests (e.g., read requests) at an MPIO module in an execution context that requires less message passing, fewer context switches, and is potentially the client's execution context itself, without utilizing the filesystem module and incurring the associated overhead. The location database utilizes the same namespace as the filesystem module and a versioning system to implicitly invalidate objects without requiring traversal of a hierarchy. Accordingly, this technology advantageously reduces the latency experienced by clients for certain operations in data storage networks.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    storing, by a computing device, objects in a hierarchy, wherein a subset of the objects corresponds to a data block in a filesystem and has a mapping of a logical address to a physical storage location for the data block and each of the objects includes a parent version number of a parent of the object and an object version number;
    updating, by the computing device, the object version number for one of the objects, when an invalidation event associated with the one of the objects is determined to have occurred, wherein the invalidation event results from a modification of an attribute of the one of the objects;
    receiving, by the computing device, a request with one of the logical addresses for one of the data blocks that corresponds to a child of the one of the objects; and
    forwarding, by the computing device, the request to a filesystem module in a different execution context upon determining the child of the one of the objects is invalid based on a comparison of the parent version number in the child of the one of the objects to the object version number in the one of the objects.

2. The method of claim 1, further comprising determining, by the computing device, when the child of the one of the objects is valid based on one or more of the object version numbers associated with another subset of the objects in a path in the hierarchy that includes the one of the objects and the child of the one of the objects.

3. The method of claim 2, wherein the each of the subset of the objects is at a bottom of the hierarchy and the request is a read request.

4. The method of claim 2, further comprising servicing, by the computing device, the request using one of the physical storage locations mapped to the one of the logical addresses upon determining the child of the one of the objects is valid based on the comparison.

5. The method of claim 1, wherein the child of the one of the objects is determined to be invalid when the parent version number in the child of the one of the objects is different than the object version number in the one of the objects.

6. The method of claim 1, wherein the object version number is based on a time of last update in a location database and one or more of the object version numbers are generated based on a current timestamp counter.

7. A non-transitory machine readable medium having stored thereon instructions for accelerating storage media access comprising machine executable code which when executed by at least one machine causes the machine to:
    store objects in a hierarchy, wherein a subset of the objects corresponds to a data block in a filesystem and has a mapping of a logical address to a physical storage location for the data block and each of the objects includes a parent version number of a parent of the object and an object version number;
    update the object version number for one of the objects, when an invalidation event associated with the one of the objects is determined to have occurred, wherein the invalidation event results from a modification of an attribute of the one of the objects;
    receive a request with one of the logical addresses for one of the data blocks that corresponds to a child of the one of the objects; and
    forward the request to a filesystem module in a different execution context upon determining the child of the one of the objects is invalid based on a comparison of the parent version number in the child of the one of the objects to the object version number in the one of the objects.

8. The non-transitory machine readable medium of claim 7, wherein the machine executable code when executed by the machine further causes the machine to determine when the child of the one of the objects is valid based on one or more of the object version numbers associated with another subset of the objects in a path in the hierarchy that includes the one of the objects and the child of the one of the objects.

9. The non-transitory machine readable medium of claim 8, wherein the each of the subset of the objects is at a bottom of the hierarchy and the data access request is a read request.

10. The non-transitory machine readable medium of claim 8, wherein the machine executable code when executed by the machine further causes the machine to service the request using one of the physical storage locations mapped to the one of the logical addresses upon determining the child of the one of the objects is valid based on the comparison.

11. The non-transitory machine readable medium of claim 7, wherein the child of the one of the objects is determined to be invalid when the parent version number in the child of the one of the objects is different than the object version number in the one of the objects.

12. The non-transitory machine readable medium of claim 7, wherein the object version number is based on a time of last update in a location database and one or more of the object version numbers are generated based on a current timestamp counter.

13. A computing device, comprising:
a memory containing machine readable medium comprising machine executable code having stored thereon instructions for accelerating storage media access; and
a processor coupled to the memory, the processor configured to execute the machine executable code to cause the processor to:
store objects in a hierarchy, wherein a subset of the objects corresponds to a data block in a filesystem and has a mapping of a logical address to a physical storage location for the data block and each of the objects includes a parent version number of a parent of the object and an object version number;
update the object version number for one of the objects, when an invalidation event associated with the one of the objects is determined to have occurred, wherein the invalidation event results from a modification of an attribute of the one of the objects;
receive a request with one of the logical addresses for one of the data blocks that corresponds to a child of the one of the objects; and
forward the request to a filesystem module in a different execution context upon determining the child of the one of the objects is invalid based on a comparison of the parent version number in the child of the one of the objects to the object version number in the one of the objects.

14. The computing device of claim 13, wherein the processor is further configured to execute the machine executable code to further cause the processor to determine when the child of the one of the objects is valid based on one or more of the object version numbers associated with another subset of the objects in a path in the hierarchy that includes the one of the objects and the child of the one of the objects.

15. The computing device of claim 14, wherein the each of the subset of the objects is at a bottom of the hierarchy and the data access request is a read request.

16. The computing device of claim 14, wherein the processor is further configured to execute the machine executable code to further cause the processor to service the request using one of the physical storage locations mapped to the one of the logical addresses upon determining the child of the one of the objects is valid based on the comparison.

17. The computing device of claim 16, wherein the processor is further configured to execute the machine executable code to further cause the processor to determine the one of the physical storage locations is valid when the parent version number in the child one of the one of the objects matches the object version number in the parent one of the objects.

18. The computing device of claim 13, wherein the child of the one of the objects is determined to be invalid when the parent version number in the child of the one of the objects is different than the object version number in the one of the objects.

19. The computing device of claim 13, wherein the object version number is based on a time of last update in a location database and one or more of the object version numbers are generated based on a current timestamp counter.

* * * * *